United States Patent

Sauter

[19]

[11] Patent Number: 6,122,872
[45] Date of Patent: Sep. 26, 2000

[54] TWO-PART SEPARABLE BASE MOLDING

[76] Inventor: Mark J. Sauter, 1322 Joyce Ave., Palatine, Ill. 60067

[21] Appl. No.: 09/289,301

[22] Filed: Apr. 9, 1999

[51] Int. Cl.[7] .................................................. E04F 19/04
[52] U.S. Cl. .................... 52/288.1; 52/287.1; 52/718.04; 52/718.06; 52/718.03; 52/717.05; 174/48
[58] Field of Search .............................. 52/287.1, 288.1, 52/290, 718.03, 718.04, 718.05, 718.06, 717.05, 717.06, 718.02; 174/48, 49

[56] References Cited

U.S. PATENT DOCUMENTS

| | | | |
|---|---|---|---|
| 1,936,507 | 11/1933 | Green ....................... | 52/287.1 |
| 1,963,662 | 6/1934 | Knapp ....................... | 52/287.1 |
| 2,203,119 | 6/1940 | Wollaeger . | |
| 2,478,006 | 8/1949 | Paden ........................ | 439/120 |
| 3,201,909 | 8/1965 | Grün . | |
| 3,228,160 | 1/1966 | O'Brien . | |
| 3,286,422 | 11/1966 | Pangerl ...................... | 52/288.1 |
| 3,422,584 | 1/1969 | Howard . | |
| 3,448,552 | 6/1969 | Schmitt et al. . | |
| 3,449,873 | 6/1969 | Damato et al. . | |
| 3,464,177 | 9/1969 | Amato ....................... | 52/288.1 |
| 3,707,061 | 12/1972 | Collette et al. . | |
| 3,911,637 | 10/1975 | Schmidlger . | |
| 4,037,900 | 7/1977 | Schmidger . | |
| 4,204,376 | 5/1980 | Calvert . | |
| 4,461,135 | 7/1984 | Anderson et al. . | |
| 4,565,041 | 1/1986 | Wendt . | |
| 4,569,171 | 2/1986 | Kuhr et al. . | |
| 4,800,699 | 1/1989 | Lang . | |
| 4,845,910 | 7/1989 | Hanson et al. . | |
| 4,986,332 | 1/1991 | Lanuza . | |
| 5,243,800 | 9/1993 | Olbrich ..................... | 52/287.1 |
| 5,274,972 | 1/1994 | Hansen ................... | 52/287.1 X |
| 5,598,681 | 2/1997 | DiGianni . | |
| 5,694,726 | 12/1997 | Wu . | |
| 5,752,356 | 5/1998 | Miklavic et al. . | |

FOREIGN PATENT DOCUMENTS

| | | | |
|---|---|---|---|
| 835019 | 2/1970 | Canada ...................... | 52/290 |
| 1317930 | 1/1963 | France ....................... | 52/288.1 |
| 618898 | 3/1961 | Italy ........................... | 52/288.1 |
| 713249 | 9/1966 | Italy ........................... | 52/290 |
| 362512 | 7/1962 | Switzerland ............... | 52/288.1 |
| 1032103 | 6/1966 | United Kingdom ....... | 52/288.1 |
| 1144551 | 3/1969 | United Kingdom ....... | 52/288.1 |

*Primary Examiner*—Laura A. Callo
*Attorney, Agent, or Firm*—Welsh & Katz, Ltd.

[57] ABSTRACT

A two-part base molding system for mounting a wall base molding to a wall adjacent a floor includes a mounting portion and a separable base molding portion. The mounting portion is mountable to the wall adjacent the floor. The mounting portion defines a main body portion having a top edge and includes a plurality of engaging elements extending transversely from the main body portion. The engaging elements of at least one pair of the elements are arrayed in spaced vertical relation to one another. Each engaging element defines an engaging surface spaced from the main body portion. The molding portion is removably mounted to the mounting portion, and includes a main body portion having at least two engaging elements extending transversely therefrom. The engaging elements are vertically spaced from one another and include an engaging surface configured for engagement with the mounting portion engaging elements. The molding portion engages the mounting portion, with the engaging surfaces secured to one another, to mount the molding to the mount. The molding portion includes an upper inwardly curved portion integral with and extending from the main body portion that extends over the mounting portion top edge to abut the wall when the molding portion is mounted to the mounting portion.

20 Claims, 1 Drawing Sheet

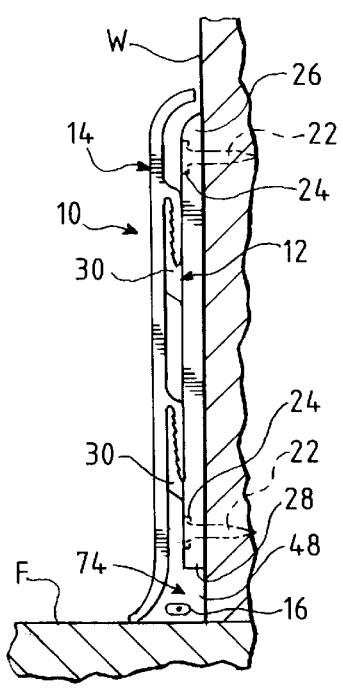
FIG. 1
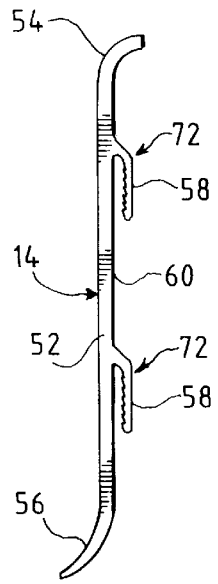
FIG. 2
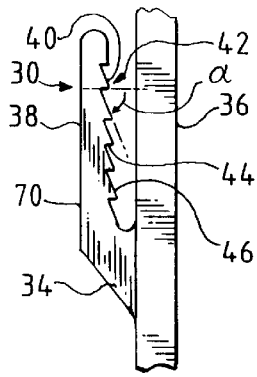
FIG. 3a
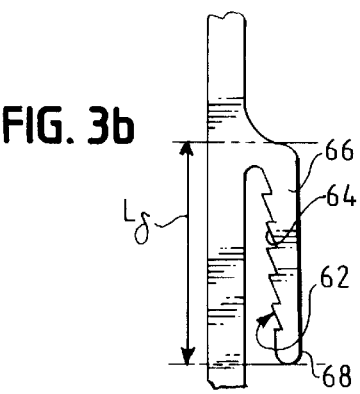
FIG. 3b
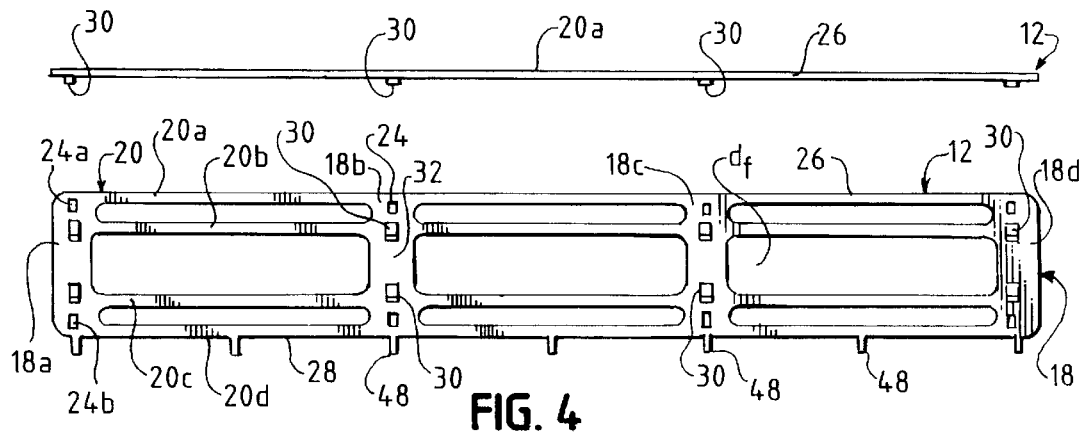
FIG. 5
FIG. 4

TWO-PART SEPARABLE BASE MOLDING

FIELD OF THE INVENTION

This invention pertains to a two-part base molding. More particularly, this invention pertains to a two-part wall base molding system in which a visible molding portion is separable from a wall mount to readily permit removing the visible base molding portion.

BACKGROUND OF THE INVENTION

Wall base moldings are commonly used where a wall meets a floor to provide a neat and acceptable appearance at the wall-floor juncture. Moldings are made from a variety of materials, using a variety of methods. One commonly used type of molding is made from a polymeric material, such as polyvinyl chloride (PVC) that is extruded in a well known process. Extruded PVC molding is typically a cost effective building material that can be provided in an array of colors and styles.

Moldings are also used to hide an abundance of imperfections and inconsistencies in a wall finish. That is, where walls are not finished to the floor, low spots, wall openings, and the like could otherwise be visible without the use of a base molding. In many instances, it may also be advantageous to position narrow gauge cabling, such as telephone wiring between a molding and the wall to reduce or eliminate what could otherwise be an unsightly appearance.

Various types of extruded moldings, both permanent and removable are known in the art. Those skilled in the art will recognize that permanent types of moldings have a variety of drawbacks. First, permanent moldings cannot be easily removed. Typically, these moldings are affixed to the wall using an adhesive, which upon removing the molding from the wall, will often remove a portion of the wall with the molding. Even if the molding is removed without damaging the wall, the adhesive may be so well adhered to the wall, that in removing the remaining adhesive, the wall becomes damaged. Moreover, if the molding requires replacement due to age or damage, or a change in color is desired, these same problems are encountered.

In addition, when painting, it is necessary to carefully tape or otherwise protect moldings so that cleanup is minimized or reduced. The time needed to protect such moldings can be time consuming, labor intensive and costly.

One known type of removable molding includes a mechanical hook and loop fastening system, such as VEL-CRO® brand strips to mount the molding to the wall. In such an arrangement, one of the portions or strips of the fastening system is affixed to the wall and the other is affixed to the molding. The molding is then mounted to the wall by joining the fastening strips to one another. Although this type of system is adequate to mount the molding to the wall, the molding requires proper alignment to assure that the molding is properly mounted to the wall. In addition, most consumers will recognize that these mechanical hook and loop fastening strips may not maintain a tight "fit" of the molding to the wall, and can lose their effectiveness over time, particularly when subjected to dust, lint and like debris.

Accordingly, there is a need for a removable wall base molding system that permits ready installation. Desirably, such a system is provided in a two-part assembly that is self-aligning when installed. Most desirably such a system maintains a strong, structurally sound mounting of the molding to the wall, and permits the installation of small gauge cabling or wires between the molding and the wall to reduce or eliminate unsightly, visible wiring.

SUMMARY OF THE INVENTION

A two-part base molding system for mounting a wall base molding to a wall adjacent a floor includes a mounting portion mountable to the wall adjacent the floor and a removable, mechanically fastened or mounted wall base molding portion. The molding portion can be removed to perform maintenance on the wall, to paint, or to change the molding to, for example, match a new color scheme.

The mounting portion defines a main body having a top edge and includes a plurality of engaging elements extending transversely from the main body. At least one pair of the engaging elements is arrayed in spaced vertical relation to one another. Preferably, the engaging elements are arranged in pairs, namely, upper and lower paired elements. Each engaging element defines an engaging surface spaced from the main body portion. In a preferred embodiment, the engaging elements are formed having a hook-like shape and the engaging surface includes serrations formed thereon.

The molding portion is removably mounted to the mounting portion. The molding portion includes a main body portion having engaging elements extending transversely therefrom. Preferably, two engaging elements extend from the molding portion that are vertically spaced from one another. The engaging elements are configured in a manner similar to the mounting portion, and include an engaging surface configured for engagement with the mounting portion engaging elements. In a preferred embodiment, the engaging elements are formed having a hook-like shape and the engaging surface includes serrations formed thereon. The serrations are defined by a steep face and a shallow face. Preferably, the angle formed by the steep and shallow angle faces is about 65° to about 90° and most preferably about 74°.

In a most preferred embodiment, the molding portion includes an upper inwardly curved portion integral with and extending from the main body portion and a lower outwardly curved portion. The upper curved portion extends over the mounting portion top edge to abut the wall, and the lower curved portion, which curves in a direction opposite the top curved portion, abuts the floor when the molding portion is mounted to the mounting portion.

In a current embodiment, the mounting portion includes a plurality of spacing elements depending therefrom to position the molding portion in non-compressed engagement with the floor when the molding portion is mounted to the mounting portion.

The molding portion can be formed as an extruded part, and to this end, the molding portion engaging elements are formed as an elongated flange portions extending essentially along a length of the molding portion.

The mounting portion can be a molded lattice-like member formed from a plurality of vertical sections connected to one another and integral with a plurality of horizontal connecting members. The engaging elements can extend from the vertical sections.

Advantageously, the molding portion mounts to the mounting portion to define a space between the molding and the mount or the wall. This space can be used to accommodate light gauge wire or cabling, such as telephone wiring, to create a more aesthetically pleasing installation.

Other features and advantages of the present invention will be apparent from the following detailed description, the accompanying drawings, and the appended claims.

BRIEF DESCRIPTION OF THE FIGURES

FIG. 1 is a cross-sectional view of one embodiment of a two-part separable base molding system embodying the principles of the present invention illustrated with the molding and mounting portions connected to one another;

FIG. 2 is a cross-sectional view similar to FIG. 1, illustrating the molding portion of the system separated from the mounting portion;

FIGS. 3a and 3b are enlarged views of a mounting portion engaging element and a molding portion engaging element, respectively;

FIG. 4 is a front elevational view of an embodiment of the mounting portion of the present system; and FIG. 5 is a top view of the mounting portion of FIG. 4.

DETAILED DESCRIPTION OF THE PREFERRED EMBODIMENT

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring now to the figures, and particularly, to FIG. 1, there is shown one embodiment of a two-part, separable base molding system 10 in accordance with the principles of the present invention. The molding system 10 includes, generally, a wall mounting portion 12 and a molding portion 14. The wall mounting portion 12, referred to herein as "the mount," is configured for permanent or semi-permanent installation to a wall W to which the system 10 is affixed. The molding portion 14 mechanically mounts to the mount 12 to, when installed, provide a visually appealing, aesthetically pleasing appearance. The molding portion 14 is readily mounted to and removed from the mount 12 so that it can be removed to, for example, perform maintenance to the wall W or a component behind the wall, or to install or change wiring 16 between the molding 14 and the wall W.

The wall mounting portion 12 can be formed, as shown in FIGS. 5 and 6, as a lattice-like structure. The mount 12 includes a plurality of spaced, vertically oriented sections 18a–d connected to adjacent vertical sections 18 by a plurality of horizontally oriented connecting members 20a–d. As illustrated, the mount 12 is a relatively rigid structural part that is readily affixed to the wall W.

The mount 12 can be mounted to the wall W using a variety of methods, such a liquid adhesives and the like. Preferably, the mount 12 is affixed to the wall W using mechanical fasteners 22, such as screws, that are received in fastener openings 24 formed in the mount 12. The fastener openings 24 can be formed in the vertical sections 18 at or near the upper and lower edges 26, 28, respectively, to provide a structurally sound attachment of the mount 12 to the wall W. The upper edge 26 can be rounded or angled. In a most preferred embodiment, the fastener openings 24 are elongated or slotted to permit adjusting the height of the mount 12 relative to the floor F.

At least one, and preferably a pair of engaging elements 30 extends outwardly from each of the vertical sections 18. The engaging elements 30 extend outwardly and upwardly from a central portion 32 of the vertical sections 18, preferably between the upper and lower fastener openings 24a,b. As will be described below, centrally positioning the engaging elements 30 transfers any stresses on the mount 12 (as a result of installing or removing the base molding portion 14) to the outwardly positioned fasteners 22.

Referring to FIG. 3a, in a most preferred embodiment, the engaging elements 30 have a hook-like shape defined by a base portion 34 that extends transversely from the mount main body 36 and a free leg portion 38 that extends from the base 34, generally parallel to the main body 36. The engaging elements 30 each include a plurality of serrations or teeth 40 along an engaging surface 42 thereof. The serrations 40, which are formed along substantially the entirety of the engaging surface 42, are defined by a steep angle face 44 and a shallow angle face 46. In a current embodiment, an angle $\alpha$ is defined by the steep and shallow angle faces 44, 46 of about 65° to about 90° and most preferably about 74°.

Referring again to FIG. 1, preferably, the mounting portion 12 includes spacing elements 48 depending from about the lower edge 28. The spacing elements 48 can depend from the mount 12 at about each of the vertical sections 18. As will be described below, the spacing elements 48 permit rapid installation of the mount 12, without detailed and time-consuming measurements, by assuring that the mount 12, and thus the base molding portion 14, is properly spaced from the floor F.

Referring now to FIGS. 1, 2 and 3b, the base molding portion 14 is a finishing element that will be readily recognized by those skilled in the art. The molding portion 14 includes a main or central body 52 integral with an upper curved cove portion 54 that is configured to extend to and rest against or abut the wall W. A lower curved cove portion 56 is integral with the central body 52 and extends in a direction opposite to that of the upper cove 54, curving downwardly, away from the wall W to meet the floor F.

As will be understood, it is important that the molding 14 meet the floor F in a precise manner. That is, the molding 14 cannot be mounted to the wall W so that a large space results between the molding 14 and the floor F. Nor 15 can the molding 14 be mounted to the wall W such that it is compressed to "fit" to the floor F. Either of these instances results in an unacceptable installation, having an unprofessional and amateur-like appearance.

The present two-part base molding system 10 overcomes this, as well as other problems by providing a readily installed, easily changeable base molding portion 14 that mounts to the permanently installed wall mount 12. Similar to the mount 12, the molding portion 14 includes integrally formed engaging elements 58 that extend outwardly from a rear surface 60 of the main body 52. Preferably, the molding portion 14 includes a pair (upper and lower) of molding engaging elements 58 that are configured to engage the mount engaging elements 30 to secure the molding portion 14 to the mount 12.

In a current embodiment, the molding engaging elements 58 are configured similar to the mount engaging elements 30. That is, the molding engaging elements 58 each have a hook-like configuration that defines an engaging surface 62. The engaging surfaces 62 are preferably formed having serrations 64 therealong that mate with or engage the serrations 40 of the mount engaging elements 30. Most preferably, the free legs 66 of the molding portion engaging elements 58 have a length $L_f$ that is less than the distance $d_f$ between the mounting portion engaging element free legs 38 so that the molding portion engaging elements 58 readily insert into and lock to the mount engaging elements 30.

In addition, as can be seen from FIG. 1, an outer surface 68 of each of the molding portion engaging elements 58, that is, that surface 68 of each engaging element 58 that is opposingly oriented relative to its engaging surface 62, abuts the mount 12 between its engaging element 30 and its supporting vertical section 18. Likewise, an outer surface 70 of each of the mount engaging elements 30, that is, that surface 70 of each engaging element 30 that is opposingly oriented relative to its engaging surface 42, abuts the molding portion 14 between its engaging element 58 and the main body portion 52. This engaging and abutting arrangement provides a structurally sound connection between the molding portion 14 and the mount 12.

As will be apparent from the figures, and in particular, FIG. 1, the spacing elements 48 are configured so that the molding 14, when mounted to the mount 12, will rest on the floor F surface, without a gap or space between the floor F and the molding 14, and without compressing the molding 14 against the floor F. This configuration permits installation of the molding 14 without the need for detailed measurements and layout.

In a current embodiment, the mount 12 is formed from a polymeric material, such as styrene, using well known injection molding processes. The molding portion 14 is formed from, for example, polyvinyl chloride (PVC) using an extrusion molding process. As will be recognized by those skilled in the art, because the molding portion 14 is extruded, the engaging elements 58 will be formed as continuous strips or flange-like elements, indicated at 72, that are integrally formed with the main body portion 52, and that extend the length of the particularly formed molding portion 14. To this end, longitudinal adjustment of the molding portion 14 is readily carried out, in that the molding 14 can be installed to the mount 12 anywhere along its length.

The molding portion 14 is removable from the mount 12 with minimal effort and with no damage to the wall W surface. Because the molding portion 14 is formed from PVC, it can be manufactured having a relatively high degree of strength, and at the same time, flexibility, so that pressure applied to the molding 14, inwardly toward the wall W, at about center of the molding 14, urges the molding portion engaging elements 58 outwardly, away from the wall W. With the engaging elements 58 in this orientation, the molding portion 14 can be removed from the mount 12 to, for example, perform maintenance, such as painting, on the wall W, without damage to the molding 14 or to the wall W. As provided above, the spaced fasteners 22 that secure the mount 12 to the wall W distribute any forces that may be exerted on the mount 12 to the outer edges 26, 28, thus reducing the opportunity for damage to the mount 12 and the wall W.

Advantageously, as best seen in FIG. 1, when installed, a space, as indicated at 74, is defined between the molding portion 14 and the mount 12. This space 74 extends the length of the installed molding 14. To this end, narrow gauge cabling, such as telephone wiring 16, that otherwise may be fastened to the wall W, can be installed between the molding 14 and the mount 12 or wall W. Not only does this arrangement enhance the aesthetics of the installation, but it also provides for easier maintenance of the cabling or wires, in that fasteners that are typically used to secure these cables to the wall are no longer needed, and thus do not have to be removed from the wall to access the cabling or wires.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A two-part base molding system for mounting a wall base molding to an associated wall adjacent a floor, comprising:

a mounting portion mountable to the associated wall adjacent the floor, the mounting portion including a molded lattice-like member formed from a plurality of vertical sections connected to one another and integral with a plurality of elongated horizontal connecting members, the vertical sections forming fastener openings near upper and lower edges of the vertical sections, the fastener openings being horizontally spaced from one another by a distance defined by the horizontal connecting members, wherein the mounting portion defines a main body portion containing a top edge and including a plurality of engaging elements extending transversely from a central portion of the vertical sections, the engaging elements being arrayed in spaced vertical relation to one another and being horizontally spaced from one another by the distance defined by the horizontal connecting members, each engaging element defining an engaging surface spaced from the main body portion; and a molding portion removably mounted to the mounting portion, the molding portion including a main body portion having a plurality of elements extending transversely therefrom, the engaging elements being vertically spaced from one another, each engaging element including an engaging surface configured for engagement with the mounting portion engaging elements, wherein the molding portion is engaged with the mounting portion with the molding portion engaging surface and the mounting portion engaging surface secured to one another.

2. The two-part base molding system in accordance with claim 1 wherein the molding portion includes an upper inwardly curved portion integral with and extending from the main body portion and a lower outwardly curved portion configured to abut the floor when the molding portion is mounted to the mounting portion the upper curved portion extending over the mounting portion top edge to abut the wall when the molding portion is mounted to the mounting portion.

3. The two-part base molding system in accordance with claim 2 wherein the mounting portion includes a plurality of spacing elements depending therefrom to position the molding portion in non-compressed engagement with the floor when the molding portion is mounted to the mounting portion.

4. The two-part base molding system in accordance with claim 1 wherein the molding portion at least one engaging element is formed as an elongated flange portion extending essentially along a length of the molding portion.

5. The two-part base molding system in accordance with claim 4 wherein the mounting portion is formed with a plurality of vertically spaced pairs of discrete engaging elements, and wherein the molding portion engaging elements are formed as a pair of parallel, elongated flange portions extending essentially along the length of the molding portion.

6. The two-part base molding system in accordance with claim 5 wherein the mounting portion engaging surface includes serrations formed thereon for engaging the molding portion engaging surface.

7. The two-part base molding system in accordance with claim 6 wherein the molding portion engaging surface includes serrations formed thereon for engaging the serrations formed in the mounting portion engaging surface.

8. The two-part base molding system in accordance with claim 6 wherein the serrations on the mounting portion engaging element are formed having a steep angle face and a shallow angle face, and wherein an angle is formed between the steep and shallow angle faces of about 65° to about 90°.

9. The two-part base molding system in accordance with claim 5 wherein the mounting portion engaging surface includes serrations formed thereon for engaging the molding portion engaging surface.

10. The two-part base molding system in accordance with claim 9 wherein the serrations on the molding portion engaging element are formed having a steep angle face and a shallow angle face, and wherein an angle is formed between the steep and shallow angle faces of about 65° to about 90°.

11. The two-part base molding system in accordance with claim 10 wherein the serrations on the mounting portion engaging element are formed having a steep angle face and a shallow angle face, and wherein an angle is formed between the steep and shallow angle faces of about 65° to about 90°.

12. The two-part base molding system in accordance with claim 1 wherein each of the at least one mounting portion engaging element and the at least one molding portion engaging element is formed having a hook-like configuration including a base portion extending respectively from the mounting portion and the molding portion and a transverse leg portion contiguous with the base portion, wherein the respective engaging surfaces are formed on the transverse leg portions so as to engage one another when the molding portion is mounted to the mounting portion.

13. The two-part base molding system in accordance with claim 12 wherein serrations are formed on each of the at least one mounting portion engaging element and the at least one molding portion engaging element surfaces so that the serrations engage one another and so that an outer surface of the molding portion engaging element abuts an inner surface of the mounting portion main body when the molding portion is mounted to the mounting portion.

14. The two-part base molding system in accordance with claim 1 wherein the molding portion mounts to the mounting portion to define a space therebetween for accommodating wiring.

15. A two-part base molding system for mounting a wall base molding to a wall adjacent a floor, comprising:

a mounting portion affixable to the wall adjacent the floor, the mounting portion including a molded lattice-like member formed from a plurality of vertical sections connected to one another and integral with a plurality of horizontal connecting members, the vertical sections forming fastener openings, wherein the mounting portion defines a main body portion defining a top edge and including a plurality of upper and lower engaging elements extending from the vertical sections, the upper and lower engaging elements being arrayed in spaced vertical relation to one another and being horizontally spaced from one another by a distance defined by the horizontal connecting members, wherein the fastener openings are positioned at about the same horizontal location as the engaging elements, each engaging element defining an engaging surface spaced from the main body portion, each engaging element being formed as a hook-like element having a base portion extending transversely from the main body portion contiguous with a free leg portion extending therefrom, generally parallel to the main body portion, the engaging surfaces defining serrations therein;

a molding portion removably mounted to the mounting portion, the mounting portion including a main body portion having a pair of elongated flange-like engaging elements extending therefrom having a base portion extending transversely from the main body portion and a free leg portion extending generally parallel to the main body portion, the molding portion engaging elements being vertically spaced from one another and being horizontally spaced from one another by a distance defined by the horizontal connecting members, the engaging elements including an engaging surface, the engaging surfaces defining serrations therein and configured for engagement with the mounting portion engaging elements so that an outer surface of the molding portion engaging element abuts an inner surface of the mounting portion main body, wherein when the molding portion is engaged with the mounting portion the molding portion rests against the floor in a non-compressed state; and a plurality of fasteners, the fasteners capable of affixing the mounting portion to an associated wall by inserting the fasteners through the fastener openings of the mounting portion and into a wall.

16. The two-part base molding system in accordance with claim 15, the molding portion including upper and lower curved portions integral with the main body portion and curving in opposing directions to one another, wherein the upper curved portion is configured to extend over the mounting portion top edge and rest against the wall, and the lower curved portion is configured to curve outwardly from the wall and rest against the floor.

17. The two-part base molding system in accordance with claim 16 wherein the mounting portion includes a plurality of spacing elements depending therefrom to position the molding portion in non-compressed engagement with the floor when the molding portion is mounted to the mounting portion.

18. The two-part base molding system in accordance with claim 16 wherein each of the molding portion engaging element free legs has a length, and wherein the mounting portion engaging elements are spaced from one another a distance greater than the length of the molding portion engaging element free legs.

19. The two-part base molding system for mounting a wall base molding to a wall in accordance with clam 15, wherein the molded lattice-like member is formed from a plurality of vertical sections connected to one another and integral with a plurality of elongated horizontal connecting members, the vertical sections forming fastener openings near upper and lower edges of the vertical sections and the engaging elements extending from a central portion of each vertical section, the engaging elements and fastener openings being horizontally spaced from one another by a distance defined by the horizontal connecting members.

20. The two-part base molding system for mounting a wall base molding to a wall in accordance with claim 15, wherein the upper and lower engaging elements are at least about one-and-one-quarter to about one-and-three-quarter inches in width and wherein upper engaging elements are at least about one-quarter to about thee-quarters of an inch in height and lower engaging elements are at least about one-quarter to about three-quarters on an inch in height and wherein the fastener openings are tapered.

* * * * *